United States Patent [19]

Malle

[11] Patent Number: 5,232,044
[45] Date of Patent: Aug. 3, 1993

[54] APPARATUS FOR CASTING AN EXACT QUANTITY OF MOLTEN LEAD FOR MAKING POLE CONNECTORS FOR SETS OF ELECTRIC BATTERY PLATES

[75] Inventor: Manfred Malle, Jakob/Rosental, Austria

[73] Assignee: Akkumulatorenfabrik Dr. Leopold Jungfer, Feistritz im Rosental, Austria

[21] Appl. No.: 771,152

[22] Filed: Oct. 3, 1991

[30] Foreign Application Priority Data

Oct. 8, 1990 [AT] Austria .................................. 2026/90

[51] Int. Cl.⁵ .............................................. B22D 41/05
[52] U.S. Cl. ..................................... 164/336; 164/136
[58] Field of Search ................ 164/335, 336, 133, 136

[56] References Cited

U.S. PATENT DOCUMENTS 3,398,782 8/1968 Lauterjung ........................ 164/336
3,556,354 1/1971 Ott ..................................... 164/336
5,012,855 5/1991 Kato ................................... 164/335

FOREIGN PATENT DOCUMENTS 1197589 7/1965 Fed. Rep. of Germany ...... 164/335
4328807 11/1968 Japan ................................. 164/336
5142025 9/1976 Japan ................................. 164/336
0229463 10/1986 Japan ................................. 164/335
2053048 2/1981 United Kingdom ............... 164/336

Primary Examiner—Richard K. Seidel
Assistant Examiner—James Miner
Attorney, Agent, or Firm—Karl Hormann

[57] ABSTRACT

An apparatus for casting an exact quantity of molten lead for making battery plate poles provided with at least one scooping receptacle mounted on a pivotable shaft movable between a position in which the receptacle is immersed in molten lead provided in a smelting vessel and a position adjacent the mold where the receptacle may be tilted for casting by pivoting the shaft.

8 Claims, 3 Drawing Sheets

APPARATUS FOR CASTING AN EXACT QUANTITY OF MOLTEN LEAD FOR MAKING POLE CONNECTORS FOR SETS OF ELECTRIC BATTERY PLATES

The present invention relates to an apparatus for casting an exact quantity of molten lead into a mold for making electric battery plate poles or pole connectors.

Depending upon the voltage to be supplied by them lead batteries or accumulators may be made up of a number of cells connected in series, each cell supplying an operating voltage of about 2 volts. Thus, conventional batteries of the kind used in automotive vehicles for starting engines may consist of six cells. Each one of these cells may be provided with one or more pairs of electrode plates of opposite polarity, the positive plates being insulated or separated from the negative plates by dielectric separators. Where sets consisting of more than one pair of plates are present in a cell, all cells of the same polarity may be connected to each other by a common electrical connector, hereinafter referred to as a bridge connector. These bridge connectors may, in turn be connected to common poles.

In the past, such connectors and poles were made by manually casting molten lead or a lead alloy of an appropriate composition in suitably shaped mold cavities. Automation in the manufacture of batteries led to the development of different systems or techniques for introducing molten lead into mold cavities for individual plate sets. The quantity of molten lead required for individual plate connectors may, however, vary. Plate sets consisting of varying numbers of plates, as may be required for the manufacture of batteries of different storage capacities, would, of course, necessitate using different quantities of molten lead.

All dosing or dispensing systems hitherto known measure the required quantity of molten lead by timing the length of the interval it takes a predetermined quantity of molten lead or lead alloy to flow from a smelting vessel or the like. The control of the quantity being a function of time, a preset flow time is established for each of a number of ports connected to or feeding a mold cavity, six ports being provided for the positive bridge connectors of a 12 volt battery, and six ports for its negative connectors.

The methods and apparatus heretofore known do not, however, permit manufacturing uniformly shaped poles and pole connectors.

It is, therefore, an object of the invention to provide an apparatus for casting exact quantities of melt into a mold.

Another object of the invention resides in the provision of an apparatus for casting uniformly exact quantities of molten lead in a repetitive manner into molds.

A further object of the invention is to provide an apparatus for the making of uniformly shaped poles and bridge connectors by casting exact quantities of molten lead.

Still another object of the invention is to provide an apparatus of the kind referred to of simple structure and operability.

These and other objects of the invention are accomplished, in accordance with the present invention, by an apparatus comprising at least one scooping receptacle mounted on a horizontally disposed shaft journalled in a support for rotational movement between scooping, intermediate and casting positions of the receptacle, the support being mounted for movement between a position in which the scooping receptacle is immersed in molten lead contained within a storage vessel and a position above or adjacent to a mold for casting the molten lead.

The apparatus is of simple structure and may be operated with ease. Being made up of but a few moving parts, the apparatus is subject to comparatively little wear and tear and may by converted, within a very short time, to accommodate different batteries. More particularly, the apparatus in accordance with the invention permits manufacturing battery pole connectors of complete uniformity of cross-section. This, in turn, leads to batteries of uniform electrical performance and improved intercellular efficiency.

In an advantageous embodiment of the invention the scooping receptacle may be mounted on the shaft for adjustment relative thereto. By simply altering the inclination of the receptacle on the shaft its scooping capacity may be altered. It is of especial advantage to arrange a plurality of scooping receptacles on the shaft whereby those receptacles used for casting the bridge connectors may be rigidly mounted on the shaft, whereas the receptacles used to cast the pole connectors may be adjustable. In this manner the quantity of lead provided for the bridge connectors may be changed steplessly relative to the quantity required for the pole connectors.

In accordance with a preferred embodiment of the invention; the shaft may be provided with a crank arm connected to a cylinder. Actuation of the cylinder would result in the shaft being rotated, the extent of rotation being a function of the length of the stroke of the cylinder. Hence, in another preferred embodiment the stroke may be adjustable, as by lugs positionable to interfere with the motion of the cylinder or its piston. Controlling the extent of rotation of the shaft in this manner constitutes a simple means of altering the scooping capacity of all the scooping receptacles on the shaft.

In accordance with still another embodiment of the invention, the support may be mounted for sliding movement within the frame of the apparatus. Such movement may advantageously be imparted by a cylinder and may extend between a position in which the scooping receptacles mounted on the shaft may be immersed in a supply of molten metal and a position adjacent a mold for casting the molten metal.

The quality and uniformity of bridge connectors and pole connectors made with the apparatus of the invention has been found to be superior to those made by apparatus currently in use. More particularly, quantities of molten lead in excess of 20 grams may be set steplessly within tolerances of +/− 3 grams.

A preferred embodiment of the invention will be described in detail hereinafter with reference to the accompanying drawings, in which.

Figure 1:
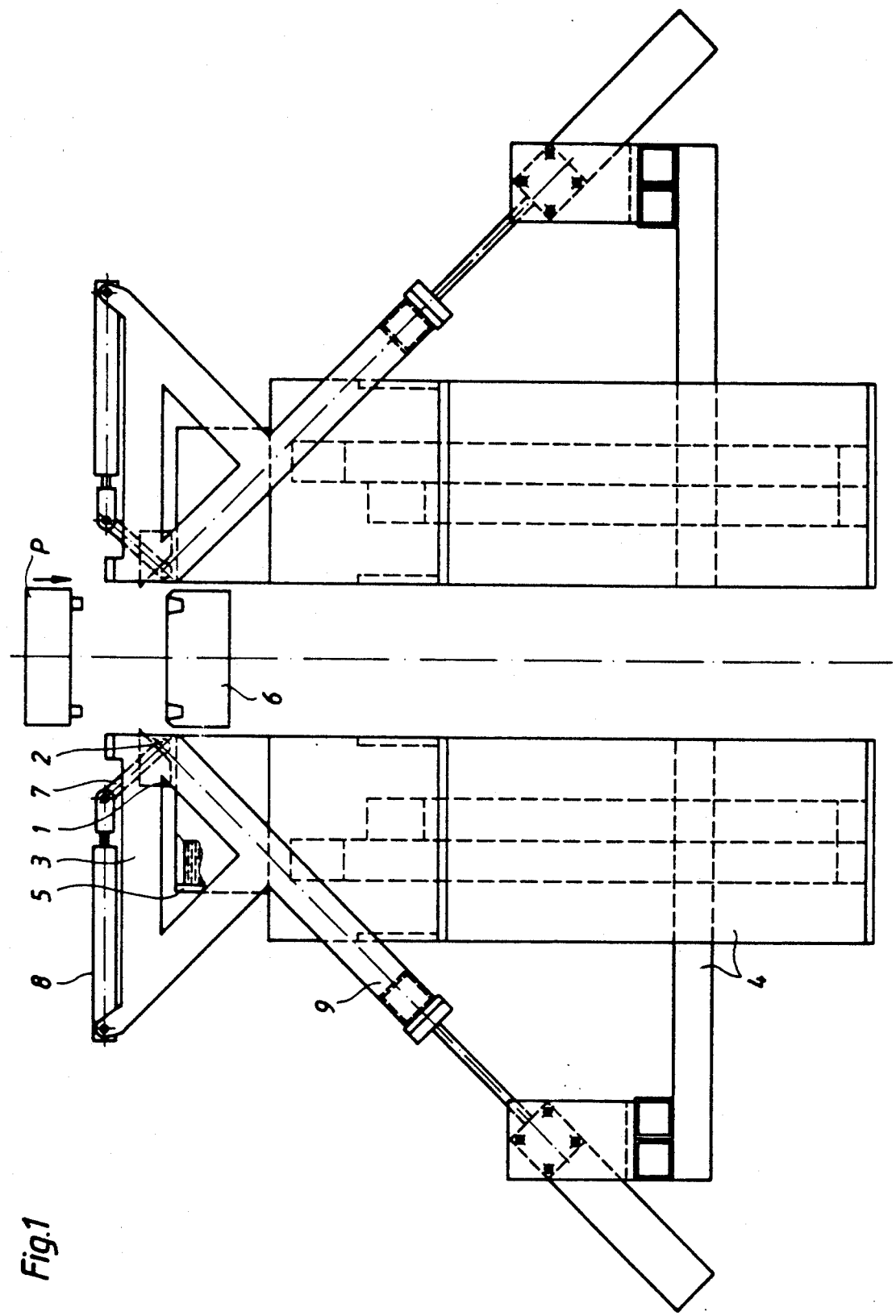
FIG. 1 is a schematic side elevation of an apparatus in accordance with the invention.

As shown in FIG. 1 the apparatus of the invention may comprise two substantially identical portions arranged mirror symmetrically on opposite sides of a vertical plane A. To the extent possible without loss of clarity, the ensuing description will, therefore, be limited to one of these portions.

Figure 9:
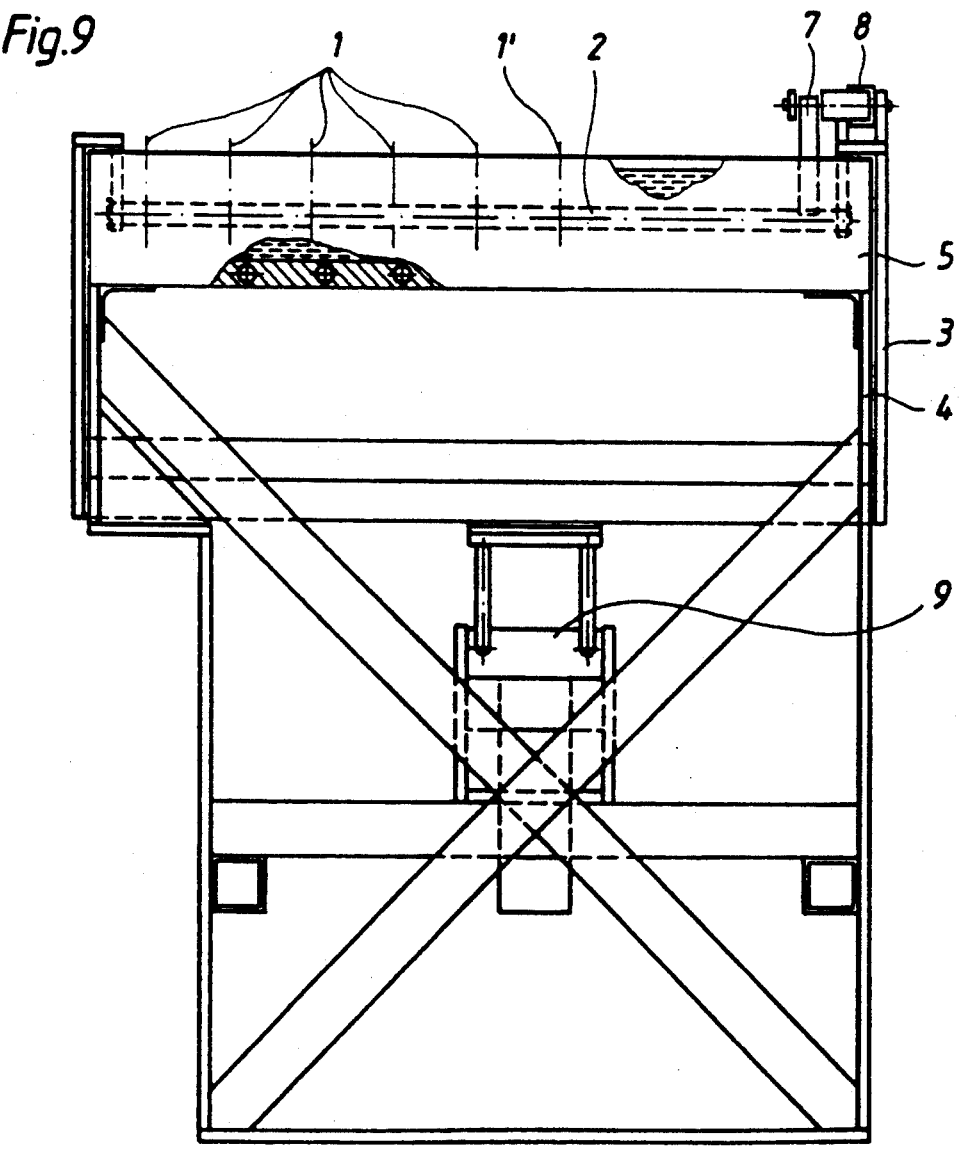
FIG. 9 is a front elevational view of the apparatus of FIG. 1

As shown in FIGS. 1 and 9, a plurality of scooping receptacles 1, hereinafter referred to as scoops, may be mounted on a horizontally disposed shaft 2 in spaced apart relationship. The shaft 2 is positioned on a side of a horizontal stack of battery plate sets P. The shaft may be journalled in a support 3 for rotary or pivotable movement between scooping and casting positions, as will be explained hereinafter. The support 3 may be mounted for sliding movement in a frame 4 of the apparatus between a position in which the scoops 1 mounted on the shaft 2 may be immersed in molten lead stored in a vessel or container 5 and a position adjacent a mold 6 provided in a plane above the vessel 5.

Figure 2:
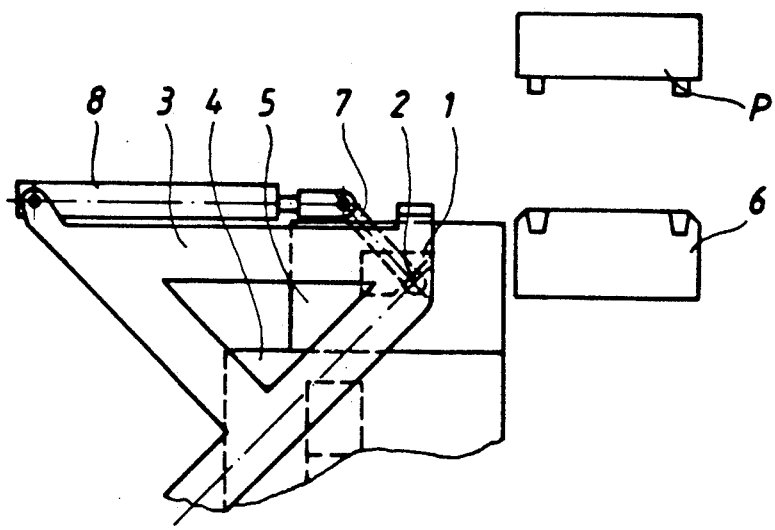
FIGS. 2-4 are views of the apparatus of FIG. 1 during different phases of a casting operation, with parts broken away for clarity.
Figure 3:
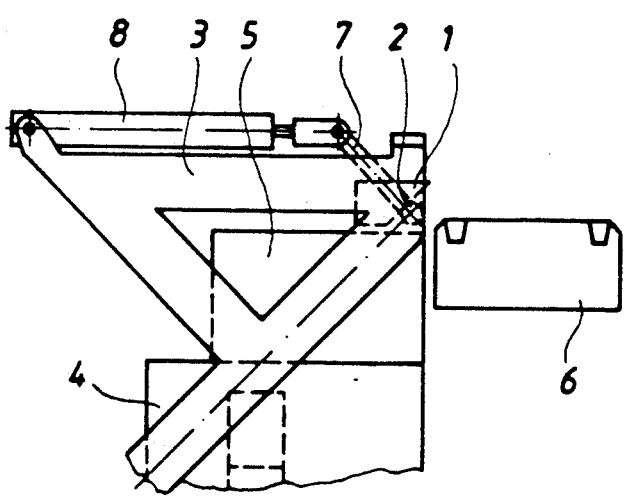
Figure 4:
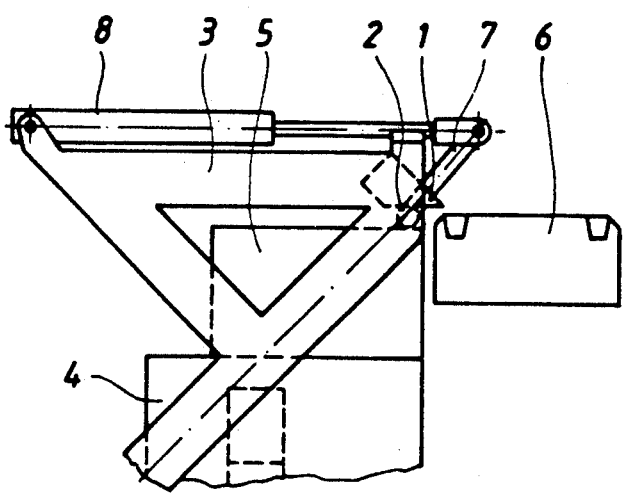

As may be seen in FIGS. 2-4, each scoop 1 may be secured on the shaft 2. The shaft 2 may be provided with a crank arm 7 which, in turn, may be connected to a cylinder 8, such as a pneumatic cylinder connected to a source of pressure (not shown). The cylinder 8 may rotate or pivot the shaft 2 and thus tilt the scoops 1 mounted thereon, the extent of pivoting being a function of the length of the stroke. Thus, to control the extent of pivoting, the cylinder 8 may be provided with lugs (not shown) selectively positionable to limit the extent of the stroke, as is well known in the art. In this manner the scooping capacity of the scoops 1 and, hence, the quantity of lead cast may be altered easily.

As shown in FIG. 1, the support 3 is connected to a cylinder 9, which may preferably be a pneumatic cylinder connected to a source of pressure not shown, by means of which the support 3 may, at the beginning of a casting cycle, be moved within the frame 4 at an angle intersecting the plane A, from a position in which the scoops 1 may be completely immersed in a supply of molten lead contained in the vessel 5 at about 500° C. (932° F.). In a manner similar to that of the cylinder 8, the stroke of the cylinder 9 may be adjusted by lugs not shown. As soon as the plate sets P to which the connectors and poles are to be applied are positioned as shown in FIG. 1, the scoops 1 may be moved out of the vessel 5 by the cylinder 9, along a path intersecting the plane A at an angle of about 45°, to a position adjacent to the mold 6 (FIG. 3) in preparation for casting the molten lead into cavities provided in the mold 6.

The final position of the stroke or of the scoops 1 adjacent to the mold 6 may be electronically monitored as by photocells or motion sensors not shown, to initiate the casting of the metal by actuating the cylinder 8 for rotating the shaft 2 and thus tilt the scoops 1 (FIG. 4).

Once the scoops 1 have been emptied they may be returned to the vessel 5 (FIG. 2) by return movements of the cylinders 8 and 9 in preparation of executing another casting operation.

While the scoops 1 are being returned to the vessel 5, the plates P may be lowered toward the molds 6 by means well known in the art but not shown for matching and connecting with the cast bridge connectors and poles before they have solidified.

Thus, the casting cycle is terminated. Once the lead has sufficiently solidified the plates P and their connectors may be removed. A new cycle may thereafter be commenced.

Figure 5:
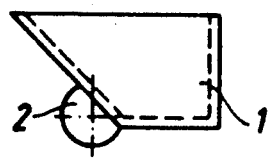
FIG. 5 is a side elevational view of a scooping receptacle for casting bridge connectors.
Figure 6:
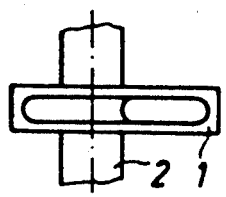
FIG. 6 is a top elevational view of the receptacle of FIG. 5.

In FIGS. 5 and 6 there is depicted a scooping receptacle 1 of the kind suitable for casting bridge connectors. For this purpose the scoop receptacle may be rigidly connected to the shaft 2, in the manner described supra.

Figure 7:
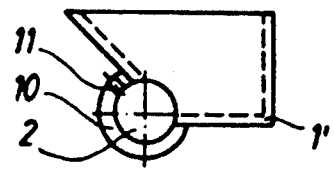
FIG. 7 is a side elevational view of a scooping receptacle for casting pole connectors
Figure 8:
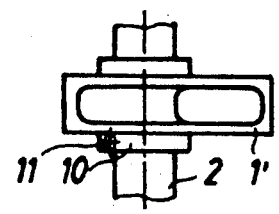
FIG. 8 is a top elevational view of the scooping receptacle of FIG. 7.

FIGS. 7 and 8, on the other hand, depict a modified scooping vessel 1' of the kind useful for casting pole connectors. In the manner described above, the scooping receptacle 1' may be mounted on the shaft 2 by a clamp 10, for selective rotation, and be arrested in any rotational position by a clamping bolt 11. By these simple means and for the purpose of independent adjustability, the inclination of the scooping receptacle 1' may be altered relative to scooping receptacles 1 to allow presetting of appropriate quantities of lead for the bridge connectors and poles.

It will thus be seen that the invention provides a simple and effective apparatus for casting battery connectors in a repetitively consistent manner in terms of appearance as well as the quantity of metal used.

What is claimed is:

1. An apparatus for casting an exact quantity of molten metal simultaneously into each one of a plurality of mold means for forming battery plate connector means, comprising:

receptacle means for storing a supply of said molten metal, said receptacle means being positioned in a first plane and said plurality of mold means being positioned in a second plane substantially parallel to and above said first plane in a side by side relationship in vertical planes of predetermined spacing from each other;

support means movably in frame means;

means for moving said support means relative to said frame means between said first and second planes;

shaft means rotatably mounted in said support means for movement therewith substantially parallel to said mold means;

means for rotating said shaft means between first and second angular positions;

a plurality of scooping means mounted on said shaft means in a side by side relationship in said vertical planes for receiving said molten metal from said receptacle means when said support means is positioned in said first plane and said shaft means is in its first angular position, and for casting said molten metal substantially simultaneously into each one of said plurality of mold means when said support means is positioned in said second plane and said shaft means is in said second angular position, at least one of said scooping means of said plurality thereof being mounted for angular movement on said shaft means relative to others of said plurality of scooping means whereby the quantity of molten metal receivable by said angularly movable scooping means is a function of its angular position on said shaft means.

2. The apparatus of claim 1, wherein said molten metal comprises lead.

3. The apparatus of claim 1, wherein said means for moving said support means comprises first pneumatic cylinder means.

4. The apparatus of claim 3, wherein said means for moving said shaft means comprises crank means.

5. The apparatus of claim 4, wherein said crank means is connected to second pneumatic cylinder means.

6. The apparatus of claim 5, wherein the length of the stroke of said second cylinder means is adjustable to adjust the degree of rotation of said shaft means.

7. The apparatus of claim 6 wherein said plurality of scooping means comprises at least one scooping means fixedly connected to said shaft means, such that the quantity of molten metal receivable by said fixedly connected scooping means is a function of the length of the stroke of said second cylinder means.

8. The apparatus of claim 7, wherein said shaft means is rotatable to said second angular position only when said support means is positioned in said second plane.

* * * * *